(12) United States Patent
Suresh et al.

(10) Patent No.: US 12,315,090 B1
(45) Date of Patent: May 27, 2025

(54) AUGMENTED REALITY VIRTUAL MAKEUP TRY-ON

(71) Applicant: Amazon Technologies, Inc., Seattle, WA (US)

(72) Inventors: Rahul Suresh, Vancouver (CA); Amin Banitalebi Dehkordi, Vancouver (CA); Sabiha Mahek Ahmed, Vancouver (CA); Yury Lizunov, Bothell, WA (US); Radhika Deodhar, Burnaby (CA); Siliang Liu, Vancouver (CA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 286 days.

(21) Appl. No.: 18/125,301

(22) Filed: Mar. 23, 2023

(51) Int. Cl.
| G06T 19/00 | (2011.01) |
| G06T 3/18 | (2024.01) |
| G06V 10/25 | (2022.01) |
| G06V 10/56 | (2022.01) |
| G06V 10/82 | (2022.01) |
| G06V 40/16 | (2022.01) |

(52) U.S. Cl.
CPC ............. *G06T 19/006* (2013.01); *G06T 3/18* (2024.01); *G06V 10/25* (2022.01); *G06V 10/56* (2022.01); *G06V 10/82* (2022.01); *G06V 40/171* (2022.01); *G06V 2201/07* (2022.01)

(58) Field of Classification Search
None
See application file for complete search history.

(56) References Cited

U.S. PATENT DOCUMENTS

| 2018/0068414 | A1* | 3/2018 | Savvides | G06T 7/536 |
| 2018/0253593 | A1* | 9/2018 | Hu | G06V 40/165 |
| 2018/0308276 | A1* | 10/2018 | Cohen | G06T 15/205 |
| 2019/0026954 | A1* | 1/2019 | Vats | G06T 13/40 |
| 2019/0035149 | A1* | 1/2019 | Chen | G06V 40/166 |
| 2020/0342209 | A1* | 10/2020 | Li | G06N 3/045 |
| 2022/0075991 | A1* | 3/2022 | Liang | G06V 40/167 |

\* cited by examiner

*Primary Examiner* — Martin Mushambo
(74) *Attorney, Agent, or Firm* — K&L Gates LLP

(57) ABSTRACT

Devices and techniques are described for augmented reality virtual makeup try-on. In some examples, first image data representing at least a portion of a human face may be received. A selection of a first virtual makeup asset from a first catalog entry may be received. A first color value and a first finish type of the first virtual makeup asset may be determined. The first color value may be predicted from an image of the first virtual makeup asset in the first catalog entry. The first finish type may be predicted from first text data included in the first catalog entry. A first 3D model of an application of the first virtual makeup asset may be generated based on a 3D mesh of at least the portion of the human face. Second image data may be generated based on the first 3D model and the first image data.

20 Claims, 15 Drawing Sheets
(1 of 15 Drawing Sheet(s) Filed in Color)

AUGMENTED REALITY VIRTUAL MAKEUP TRY-ON

BACKGROUND

Augmented and mixed reality systems combine the real, physical world with virtual objects displayed in a display that depicts both real-world objects in the physical environment and graphical representations of virtual objects as though the virtual objects are part of the physical environment. Virtual information can be constructive, in which the virtual objects add to the physical environment (e.g., adding text describing nutritional information to a plate of food) or destructive, in which the virtual objects mask some part of the physical environment. Augmented reality alters an ongoing perception of the real world and, as such, is considered to be an immersive aspect of the physical environment.

BRIEF DESCRIPTION OF DRAWINGS

This application file contains at least one drawing executed in color. Copies of this patent or patent application publication with color drawing(s) will be provided by the Office upon request and payment of the necessary fee.

DETAILED DESCRIPTION

Figure 1:
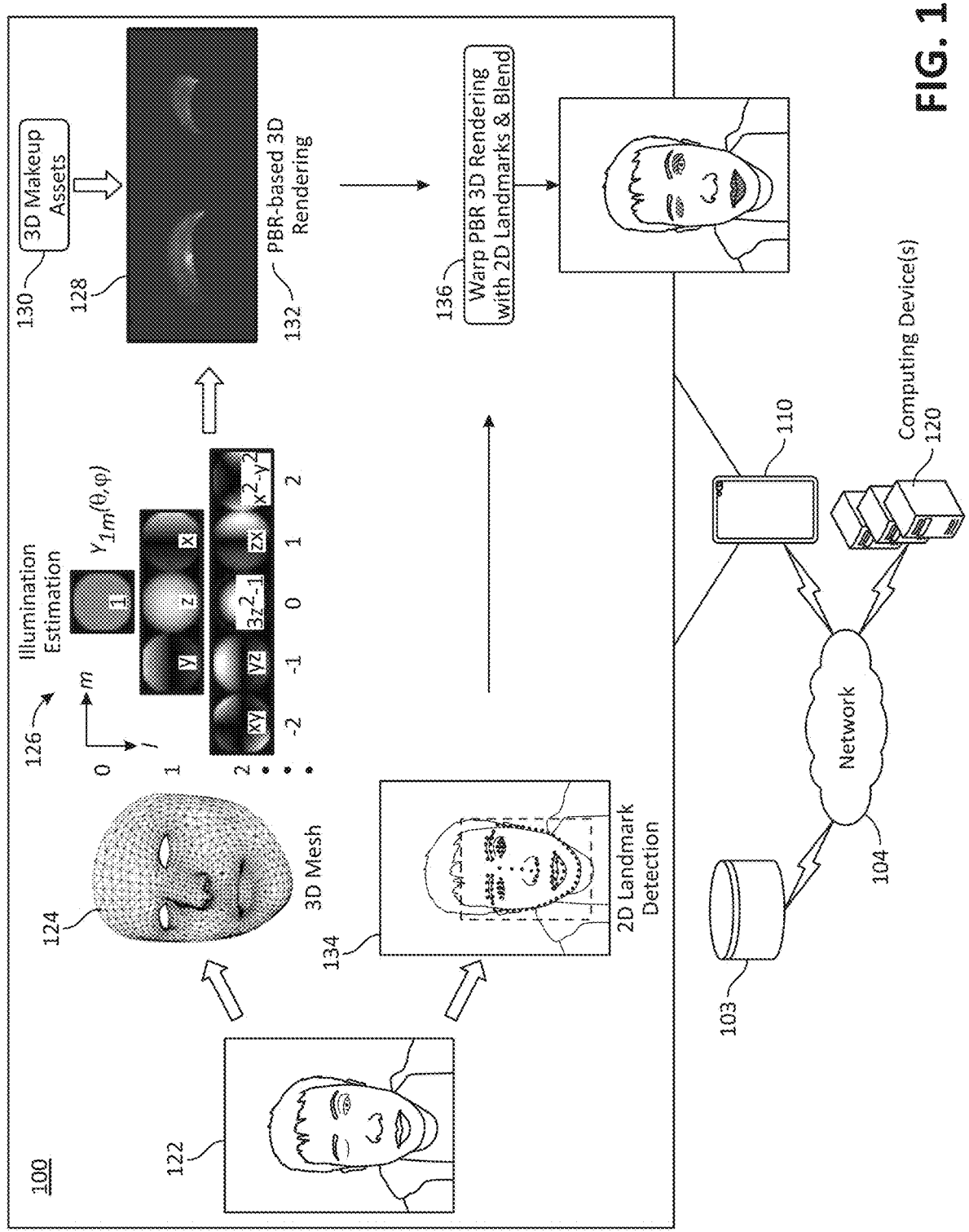
FIG. 1 depicts an example process for augmented reality virtual makeup try-on on a computing device in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Augmented reality interfaces display portions of the physical environment (e.g., the "real world" as captured by a camera) together with virtual objects (e.g., graphics, text, etc.) such that reality is augmented with the virtual objects. In augmented reality interfaces, virtual objects may be displayed in an opaque fashion such that they overlay and replace portions of the physical world. This may be desired in some instances. For example, an augmented reality skin may be used to change the print on a person's shirt to a different print. Accordingly, the desired print may be a virtual skin that is displayed overlaying the real-world print on a given person's shirt so that the virtual print, in effect, replaces the real-world print on the augmented reality display. In other cases, such as in some of the virtual makeup try-on examples described herein, virtual objects (e.g., one or more virtual makeup assets) may be partially transparent and/or pixels representing the virtual object may be blended with pixels of the real environment to create blended representations of the real world and the virtual object.

Augmented reality typically refers to interfaces in which virtual and real-world objects are displayed together on a display and in which the real-world objects were captured using one or more cameras prior to rendering the virtual objects on the display. Mixed reality, on the other hand, typically refers to interfaces including a display that is at least partially transparent. In mixed reality interfaces the user is able to directly perceive real world objects through the transparent display (as when a user wears glasses), while virtual objects may be rendered on the display and may, in some cases, occlude real world objects. Although augmented reality is typically referred to herein, the systems and techniques described herein may be equally applicable to augmented and mixed reality systems and interfaces. Accordingly, the term "augmented reality" is hereinafter used to refer to augmented reality systems and interfaces or mixed reality systems and interfaces, or in some cases, combinations of the two systems/interfaces.

In an example of an augmented reality interface, a user may select a virtual item (e.g., from an online catalog and/or via an application) and may view the virtual item in an augmented reality interface such that the virtual item appears to be placed with the user's physical environment. For example, the user may select a virtual piece of furniture and may display the virtual furniture via an augmented reality interface on the user's mobile device overlaid on top of a camera view of the physical environment. This may allow the user to see what the piece of furniture would look like if it were placed in the user's room. However, in the context of virtual makeup viewed in an augmented reality interface, it is a challenging technical problem to depict the virtual makeup item in a way that appears natural on a human face (or otherwise). This is particularly the case when rendering the virtual makeup asset in real-time (e.g., in live video).

Virtual Try-On (VTO) is a technology whose goal is to provide an immersive augmented reality experience by allowing users to try-on beauty products virtually through augmented reality. Many existing VTO experiences only provide a visualization (e.g., the filters used by many mobile video chat applications), and do not consider real, physical makeup asset attributes such as finish type, sparkle type, blending with skin tone, etc. Accurate representation of these attributes is essential for a true realistic rendering of the virtual makeup on users' faces. However, real-time processing of such a try-on experience on mobile devices is extremely challenging. For this reason, some VTO solutions support only a single virtual asset (e.g., virtual makeup asset) type at a time, requiring the user to enter the experience, try on a lipstick, exit the experience, return, and try on an eye shadow, etc. This results in a low-quality experience from a user perspective. Described herein are systems and techniques that enable users to navigate through a wide range of makeup asset types and accurately render virtual representations of multiple makeup assets in a realistic way (e.g., on the user's face) without requiring the user to exit the experience. Additionally, other functionality may be provided using the various augmented reality for virtual makeup try-on techniques described herein. For example, users may compile a list of data representing currently-applied makeup assets. The currently-applied assets may be referred to as a "look" which may be sharable with other users. In some examples, adding a new virtual asset to a current look may result in the newly-added virtual asset being rendered (using the various techniques described herein) in an augmented reality interface. Other makeup assets may be recommended to the user based on the current assets in the user's look (e.g., based on the items being determined to be visually complementary to one another).

In various further examples, a virtual divider may be displayed on the augmented reality display. On one half of the image divided by the virtual divider the user may see a first look (e.g., an image depicting a user-uploaded facial image without any virtual makeup assets applied), while on the other half of the image divided by the virtual divider the user may see a second look (e.g., an image depicting the user-uploaded facial image with one or more virtual makeup assets applied). This may be rendered in real time so that the user can view half (or some other percentage, depending on where the virtual divider is placed by the user) of the user's face with one look and half of the user's face with another look. This may enable the user to evaluate makeup assets and/or looks in contemporaneous juxtaposition with others and/or relative to how their face appears without makeup.

In various examples, the augmented reality virtual makeup try-on interfaces may be provided on mobile devices, such as through a mobile application. In some examples, the user may generate a three-dimensional (3D) headshot representing a 3D view of the user's head and the virtual makeup try-on may be applied to the 3D headshot. In other examples, the augmented reality virtual makeup try-on interface may use a live camera feed from a camera of the user device to capture images and combine the captured images with selected virtual makeup assets and may render an augmented reality display in which the selected virtual makeup assets are realistically rendered on the user's face at the appropriate positions. Users may thereby see how various makeup products (or other wearable products) may appear on the user from different perspectives. In some examples, the user may instead use images from other sources and may have the virtual makeup assets applied thereon. For example, template images may be provided through the interface and/or the user may upload images (subject to conformance with relevant privacy standards).

Depth data may be available from depth sensors of mobile devices. For example, Lidar sensors, time-of-flight sensors, stereoscopic camera sensors, etc., may be used to provide depth data comprising sets of three dimensional (3D) coordinates describing surfaces and points on objects detected in the physical environment (e.g., a user's face). The depth data may be used in conjunction with various techniques described herein to determine a mesh of the user's face, head, and/or body in the augmented reality space. The mesh may be used to generate a 3D model of a virtual makeup asset that conforms to the curvatures and/or shape of the relevant part of the user's face. For example, a 3D model of eye shadow may conform to the curvature and/or shape of the user's eyes/eyelids determined using the 3D mesh of the user's face. Additionally, illumination estimation (e.g., to determine estimated illumination characteristics) may be performed using the mesh so that the illumination may be accurately represented in the virtual makeup asset when rendered. In addition, two-dimensional (2D) landmarks (e.g., 2D facial landmarks) may be detected on the user's face (from input 2D frames of image data) and the 2D landmarks may be used to warp the rendered 3D models of the virtual makeup asset such that the warped representation of the 3D makeup asset conforms realistically to the user's face at the appropriate position. Finally, the 3D makeup asset, as warped using the 2D landmarks, may be rendered on the live camera feed of the user's face. During rendering, pixel values of the 2D view of the 3D makeup asset may be blended with pixels at the corresponding position on the user's face to account for the user's skin tone, skin texture, and/or to any other virtual makeup assets that are co-located. Various blending techniques are described in further detail below and may be used to generate a blended RGB color value that represents a blended value between the virtual makeup asset color and the skin color on which the virtual makeup asset is rendered. These and other techniques that may be used in augmented reality virtual makeup try-on are described in further detail below.

Machine learning techniques, such as those described herein, are often used to form predictions, solve problems, recognize objects in image data for classification, etc. For example, as described herein, a face detection model may detect a user's face in an input image, while a landmark detector may detect different landmarks (e.g., different points on the user's eyes, eyebrows, nose, mouth) within the image. In various other examples, a machine learning model may be used to detect a color value of a selected virtual makeup asset based on catalog images of the corresponding physical makeup. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Transformer models (e.g., transformer machine learning models) are machine learning models that include an encoder network and a decoder network. The encoder takes an input and generates feature representations (e.g., feature vectors, feature maps, etc.) of the input. In natural language processing, transformer models take sequences of words as input. For example, a transformer may receive a sentence and/or a paragraph comprising a sequence of words as an input.

In general, the encoder network of a transformer comprises a set of encoding layers that processes the input data one layer after another. Each encoder layer generates encodings (referred to herein as "embeddings"). These embeddings include feature representations (e.g., feature vectors and/or maps) that include information about which parts of the input data are relevant to each other. For example, for each input embedding the encoder layers may determine which parts of the token are relevant to other tokens received as part of the input data. Each encoder layer passes its output to the next encoder layer. The decoder network of the transformer takes the output embeddings by the encoder network and processes them using the encoded contextual information and the encoder-decoder attention mechanism to generate output embeddings. Each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs, and contain residual connections and layer normalization steps.

Scaled Dot-Product Attention

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token, the input embedding $x_i$ is multiplied with each of the three weight matrices to produce a query vector $q_i = x_i W_Q$, a key vector $k_i = x_i W_K$, and a value vector $v_i = x_i W_V$. Attention weights are calculated using the query and key vectors: the attention weight di from token is the dot product between $q_i$ and $k_j$. The attention weights are divided by the square root of the dimension of the key vectors, $\sqrt{d_k}$, which stabilizes gradients during training. The attention weights are then passed through a softmax layer that normalizes the weights to sum to. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $a_{ij}$, the attention from i to each token.

The attention calculation for all tokens can be expressed as one large matrix calculation, which is useful for training due to computational matrix operation optimizations which make matrix operations fast to compute. The matrices Q, K, and V are defined as the matrices where the ith rows are vectors $q_i$, $k_i$, and $v_i$ respectively.

$$\text{Attention}(Q, K, V) = \text{softmax}\left(\frac{QK^T}{\sqrt{d_k}}\right)V$$

Multi-Head Attention

One set of ($W_Q$, $W_K$, $W_V$) matrices is referred to herein as an attention head, and each layer in a transformer model has multiple attention heads. While one attention head attends to the tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information and embeddings of the input data as its input, rather than encodings. The position information is used by the transformer to make use of the order of the input data or in various examples described herein, the positions of the items in the input scene image. In various examples described herein, the position embedding may describe a spatial relationship of a plurality of tokens relative to other tokens. For example, an input token may represent a 16×16 (or other dimension grid) overlaid on an input frame of image data. The position embedding may describe a location of an item/token within the grid (e.g., relative to other tokens representing other portions of the frame). Accordingly, rather than a one-dimensional position embedding (as in the natural language context wherein the position of a word in a one-dimensional sentence/paragraph/document is defined), the various techniques described herein describe two-dimensional that describe the spatial location of a token within the input data (e.g., a two-dimensional position within a frame, a three-dimensional position within a point cloud, etc.).

Each decoder layer comprises three components: a self-attention mechanism (e.g., scaled dot product attention), an attention mechanism over the encodings (e.g., "encoder-decoder" attention), and a feed-forward neural network. The decoder functions in a similar fashion to the encoder, but an additional attention mechanism is inserted which instead draws relevant information from the encodings generated by the encoders. In a self-attention layer, the keys, values and queries come from the same place—in the case of the encoder, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

In various examples described herein, a transformer-based model may be used to automatically process catalog entries of makeup items (or other items for VTO) to determine accurate material properties of those items. For example, as described below, text from the description and/or title (among other potential text) may be encoded using a transformer-based model and the resulting encoding may be used to determine a finish type (e.g., a finish value such as matte (matte type), cream (cream type), gloss (gloss type), etc.) and/or a sparkle type (e.g., none, shimmer, glitter, etc.) of the makeup asset being processed. As described in further detail below, the classification heads may be trained in a supervised manner to predict any desired number of classes. These predictions may be used during rendering of the virtual makeup asset to accurately portray the finish type and/or sparkle type of the real makeup asset.

FIG. 1 depicts an example process 100 for augmented reality virtual makeup try-on on a computing device in accordance with various aspects of the present disclosure. Computing device(s) 120 may include non-transitory computer-readable memory 103 and/or may be configured in communication with non-transitory computer-readable memory 103, such as over network 104. In various examples, network 104 may represent a local area network (LAN) and/or a wide area network (WAN) such as the internet. In various examples, non-transitory computer-readable memory 103 may store instructions that may be used to implement the augmented reality interface and/or the dynamic occlusion techniques described herein.

A mobile device 110 (e.g., a smart phone, tablet device, wearable device (e.g., including AR glasses, etc.) and/or any other mobile device including a camera and at least one processor) may include a light detection and ranging (Lidar) sensor, in addition to an image sensor configured to generate frames of RGB image data (e.g., input image 122). A mobile application may execute on the mobile device 110. The mobile application may provide an augmented reality interface that is effective to display a real-world environment along with integrated virtual objects (e.g., virtual makeup assets). The mobile application may employ the camera and the Lidar sensor of the mobile device and may provide a visualization of the user (using a live view of the camera feed). The visualization may guide the user through scanning the user's face, head, and/or body (e.g., for a particular virtual try-on experience). In the example of virtual makeup try-on, the user may be directed to scan the user's face and/or head to generate a 3D mesh 124 of the user's face.

Depending on the particular mobile device 110, a camera and/or a depth sensor (e.g., a Lidar sensor) may generate depth map data. The depth map data may include distance information representing the distance between the camera (and/or other depth sensor) to the various surfaces of the user's face in an image captured by the camera and/or depth sensor. For example, the depth map may be a frame of image data wherein each pixel is associated with a Z-value representing a distance between the surface represented by that pixel and the camera/depth sensor. Accordingly, in at least some examples, a depth map may be a frame of image data in which each pixel (or each pixel for which there is depth information) comprises R, G, B, and Z values. The depth map may be used to generate the 3D mesh 124.

In various examples, illumination estimation 126 may be performed using spherical harmonics. The illumination estimation 126 may be used to estimate the direction and/or strength of illumination on the mesh in order to render the virtual makeup assets on the 3D model in a realistic looking manner. To this end, the illumination estimation 126 captures how much light is cast upon shaders surface at any point of time by measuring: a) light intensity: as the strongest directional light source in the scene, b) light direction: as a vector indicating the orientation of the strongest directional light source in the scene, and c) the Spherical Harmonics Coefficients (SHC): data describing the estimated lighting environment in all directions. 3D makeup assets 130 may be received from non-transitory computer-readable memory (e.g., non-transitory computer-readable memory 103). The 3D makeup assets 130 may correspond to those selected by the user (via a graphical user interface of the virtual try-on experience). These 3D makeup assets 130 may be 3D models of the makeup assets which are generic (e.g., non-specific to the user's face). However, specific material properties may be extracted for each of these 3D makeup assets (e.g., RGB pixel color values, a finish type property, and/or a sparkle type property) from catalog entries for the various selectable makeup assets in an automated manner. These material property extraction techniques are discussed in further detail below in reference to FIGS. 3A and 3B. Accordingly, the 3D models 128 of the selected 3D makeup assets (a 3D model of eyeshadow in FIG. 1) may have an accurate color, finish type, and/or sparkle type corresponding to the real-world asset since the accurate material properties have been extracted using the various machine learning techniques described herein and rendered on a 3D model 128 according to the specific illumination estimation techniques determined using the 3D mesh 124 of the user's face.

Physical-based 3D rendering (PBR) 132 may then be used to render the 3D model 128 on the 3D mesh 124 of the user's face. In addition, to ensure that the PBR 3D rendering conforms accurately and realistically to the user's face, 2D landmark detection 134 (described in further detail below in reference to FIGS. 2A and 2B) may be used to determine various landmarks on the user's face from input 2D images (such as the left-most point of a user's right eye, a right-most point of the user's right eye, a boundary of the user's mouth, nose, etc.). Accordingly, at action 136, the PBR 3D rendering with accurate material properties (color, finish type, sparkle type, determined for the particular illumination estimation), may be warped and/or aligned using the 2D landmarks to conform accurately to the appropriate positions on a live display of the user's face (e.g., on each frame of image data captured by the camera of mobile device 110). In addition, the color values of the virtual makeup asset may be blended with the color values of any other co-located virtual makeup assets and/or with the pixel values representing the user's face (and thus their skin tone) according to a blending parameter to accurately portray a realistic appearance of the virtual makeup asset on the specific user's face with or without one or more other virtual makeup assets being contemporaneously applied.

Figure 2A:
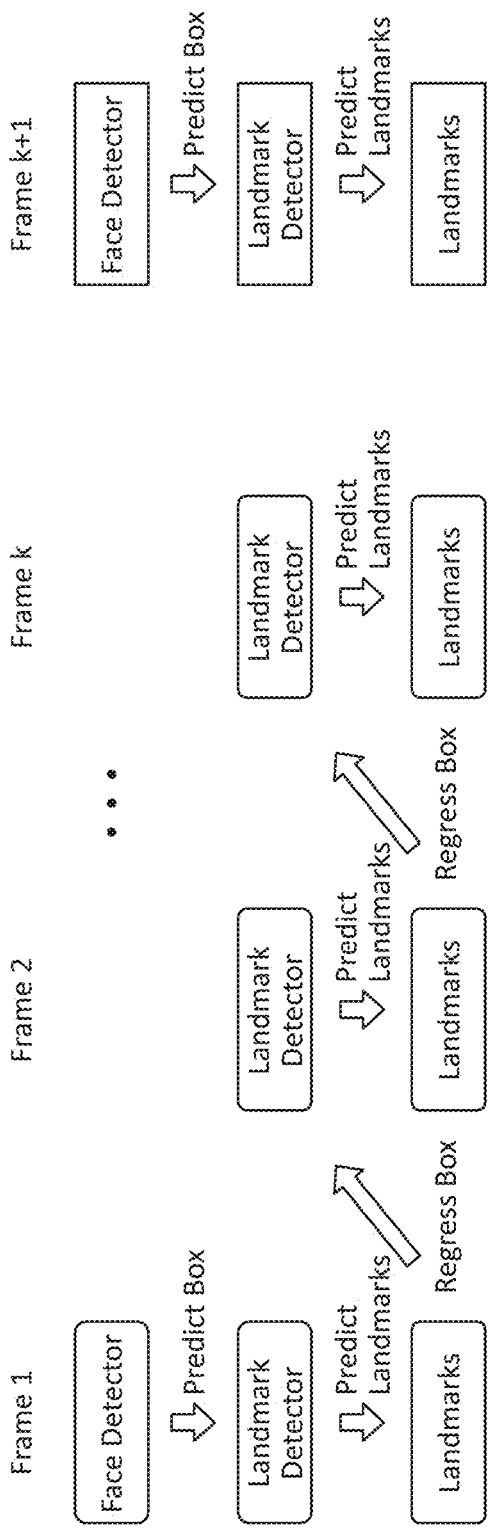
FIG. 2A depicts an example process for two-dimensional landmark detection, in accordance with various techniques described herein.

FIG. 2A depicts an example process for two-dimensional landmark detection, in accordance with various techniques described herein. As shown in FIG. 2A, in various examples used herein, a face detector may first be employed on an initial image frame to detect a user's face in an image. Generally, the face detector may use a convolutional neural network (CNN) to encode an input frame and may include a classifier (e.g., an FCN) trained in a supervised manner to detect and/or generate a bounding box around a human face detected in the frame. As shown in FIG. 2A, in various examples, the face detector may be used at a particular cadence (e.g., every k frames) to reduce compute requirements. Once a bounding box is detected the bounding box may be applied to subsequent consecutive frames (until frame k+1 is reached) as the user's face is unlikely to have moved a large degree during such time.

Figure 2B:
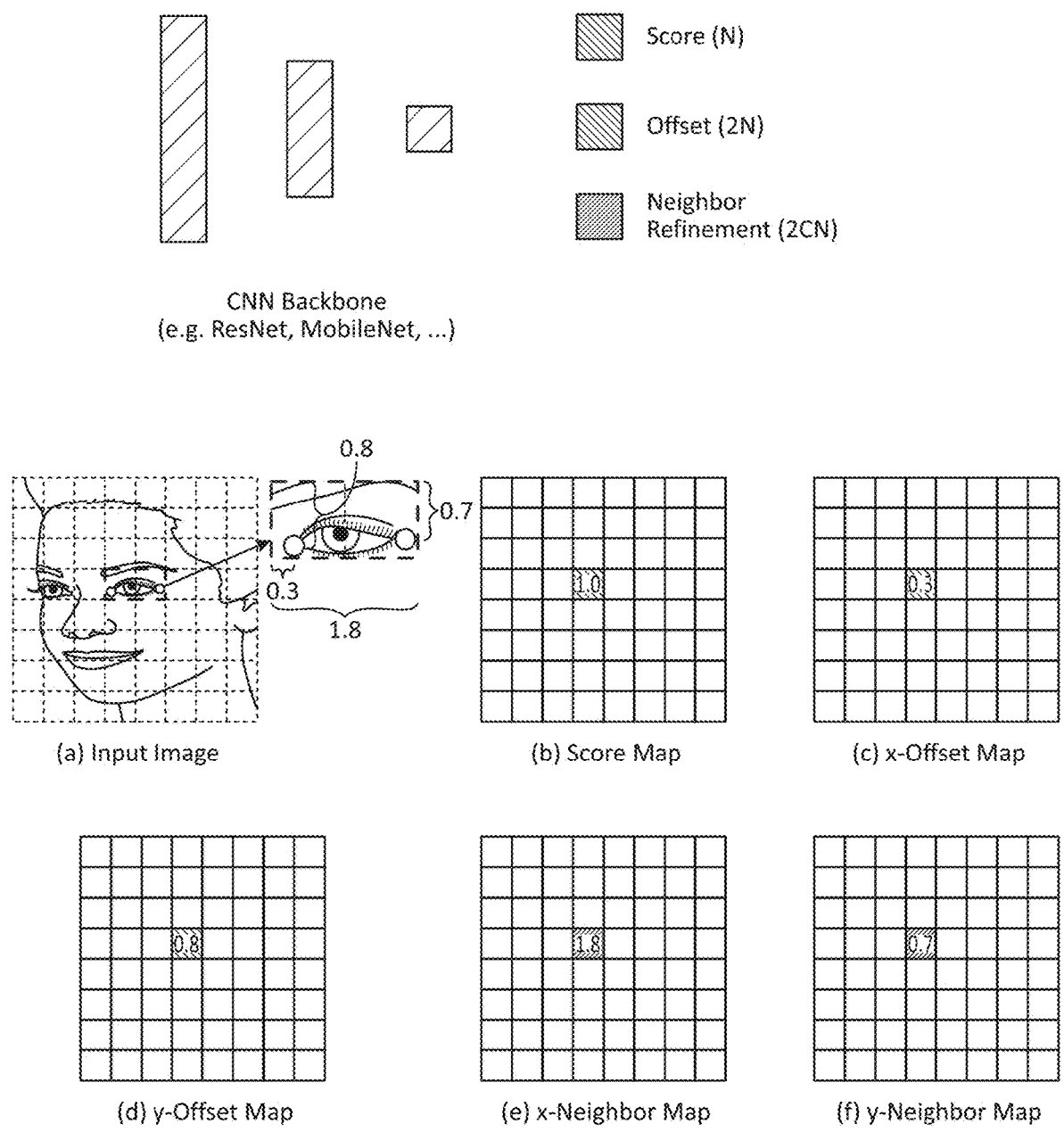
FIG. 2B depicts an example diagram of a machine learning model that may be used for two-dimensional landmark detection, in accordance with various examples described herein.

The output of the face detector may be input into a landmark detector that may detect a predefined set of facial landmarks in the 2D image frame within the bounding box detected by the face detector. In general, any type of 2D landmark detector may be used in accordance with the desired implementation. FIG. 2B describes a pixel-in-pixel net that may be used for 2D landmark detection in various examples. The output of the landmark detector is the spatial location (e.g., the pixel location/address) in the frame for each detected 2D landmark in the predefined set of landmarks. The 2D landmarks may be detected in each frame, as shown in FIG. 2A, so that the PBR-based 3D rendering 132 of the virtual makeup asset may be positioned and/or warped using the predicted 2D landmarks to accurately and realistically conform to the user's face. As shown, bounding box regression may be used to refine the bounding box locations of the predicted 2D landmarks from frame-to-frame.

FIG. 2B depicts an example diagram of a machine learning model that may be used for two-dimensional landmark detection, in accordance with various examples described herein. The example architecture for 2D facial landmark detection in FIG. 2B is a Pixel-in-Pixel net architecture using a CNN such as a ResNet model. Heatmap regression models have become popular due to their performance in locating facial landmarks. However, many heatmap regression models are computationally expensive and may be difficult to perform on mobile devices on a frame-by-frame basis. Additionally, some heatmap regression models lack explicit constraints on global shapes and suffer from domain gaps. The Pixel-in-Pixel Net (PIPNet) for facial landmark detection depicted in FIG. 2B uses a detection head based on heatmap regression, which conducts score and offset predictions simultaneously on low-resolution feature maps (e.g., generated using a CNN-based encoder). Using such low-resolution feature maps, repeated upsampling layers are not required enabling faster inference and reduced compute requirements without sacrificing model accuracy. In various examples, PIPNet uses a neighbor regression module to enforce local constraints by fusing predictions from neighboring landmarks, enhancing the robustness of the detection head. As shown in FIG. 2B, the various detection heads may determine a landmark confidence score (e.g., Score map), offsets in the x and y directions, and x- and y-neighbor maps from neighboring landmarks.

Figure 3A:
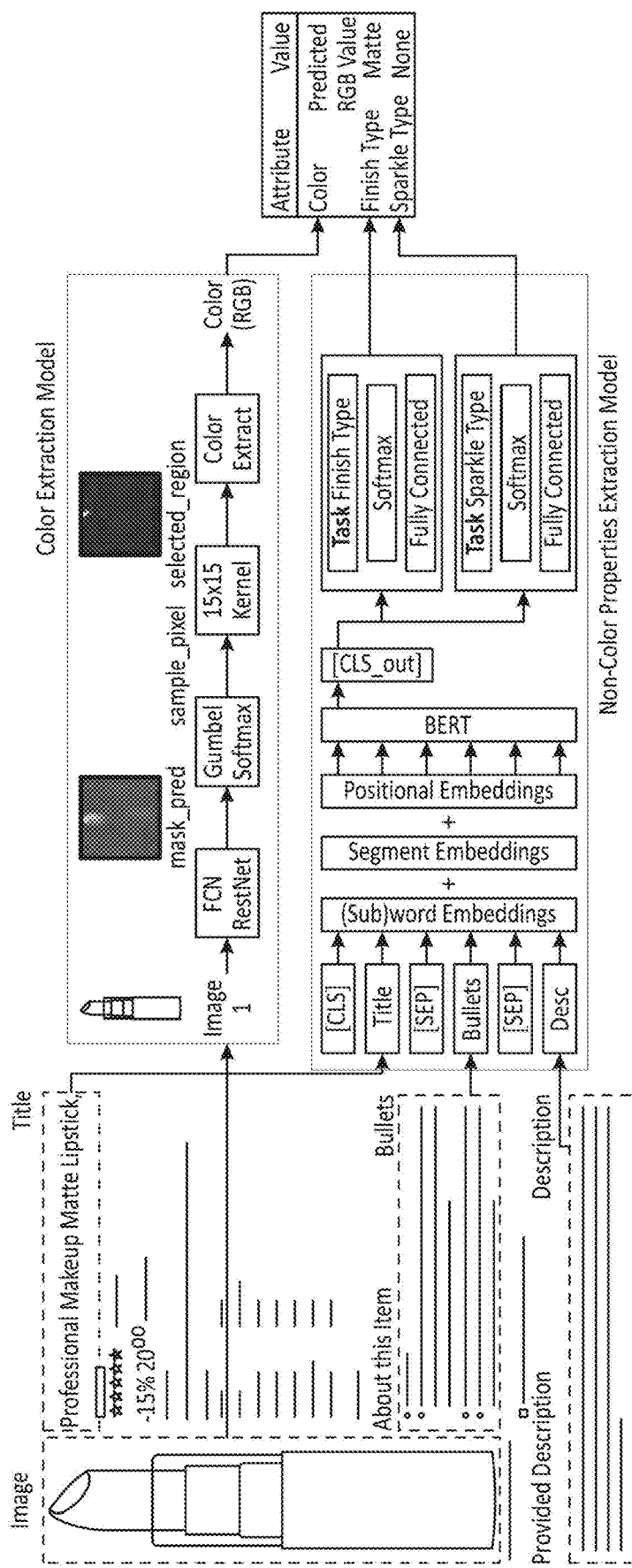
FIG. 3A depicts an example of a machine learning architecture that may be used to automatically extract material properties from catalog entries, in accordance with various aspects of the present disclosure.

FIG. 3A depicts an example of a machine learning architecture that may be used to automatically extract material properties from catalog entries, in accordance with various aspects of the present disclosure. For a small set of makeup items, it may be trivial to explicitly encode the material attributes of those items and to use such items during rendering in a virtual try-on setting. However, when there is a large and ever-expanding inventory of makeup assets, such as available via an e-commerce service that offers items from third party sellers, determining accurate material properties for a given virtual makeup asset is a challenging task. Accordingly, the architecture depicted in FIG. 3A may be used to automatically extract the color, finish type, and/or sparkle type of a given makeup asset automatically. Note that the machine learning architecture in FIG. 3A may accurately extract the color of the asset from product images that may show not only the color of the makeup, but also packaging, graphics, casings, and/or other materials which are unrelated to the makeup's color, by distinguishing between different portions of the image, determining which portion represents the makeup's color, and determining a representative value of that color. The extracted properties may be used during rendering to generate realistic images for the virtual try-on experience.

Makeup assets are diverse in color, finish types (matte, cream, gloss, etc.) and sparkle types (glitter, shimmer, none, etc.)—any of which may result in an unrealistic rendering if not accounted for in an accurate way. A manual process where a human annotates each makeup asset with ground truth data indicating the color, finish type, and/or sparkle type is costly and results in inaccuracies from labeling errors and inconsistencies between human labelers. Shown in FIG. 3A is a scalable learning-based solution that can automatically extract material properties given information (e.g., images and text) in a catalog entry. In the architecture in FIG. 3A a segmentation-based strategy is used to extract the color attribute. In addition, a transformer-based (e.g., BERT) multitask model may be used to extract finish type and/or sparkle type (e.g., non-color attributes) from the text in the catalog entry data for the makeup asset.

Color Model Architecture

To extract the color, the segmentation-based strategy uses a segmentation-based machine learning model to identify different regions-of-interest in the region. For example, for the tube of lipstick shown in FIG. 3A, the model may identify regions-of-interest such as the applicator, tube, packaging, and the lipstick itself, and then may determine the region most likely to correspond to the color of the makeup asset.

In an example implementation, the color model may comprise a CNN backbone (e.g., ResNet-50), a fully convolutional network (FCN) classifier, a Softmax layer (e.g., the Gumbel-Softmax sampler), and a trainable convolutional kernel. The Gumbel-Softmax sampler and the trainable convolutional kernel may be used to identify a region (e.g., a 15×15 pixel region) within the segmentation mask that most accurately represents the color of the makeup asset. The color extraction model may be trained via supervised learning using labeled image and color pairs.

The Gumbel-Softmax sampler is a differentiable operation that allows sampling from a continuous categorical distribution. Gumbel-Softmax may be used to select a single pixel from the image according to the logits of the positive class. Using a convolutional filter (e.g., a 15×15 pixel filter), the single pixel may be expanded to cover a wider region. The colors of the wider regions of pixels may be aggregated (e.g., by determining an average RGB pixel value) to produce a more accurate color prediction. Two losses may be used during training. A first loss, loss_mask, may represent differences between the ground truth mask of the portion of the image representing the makeup asset itself (as opposed to its packaging, background, casing, etc.). A second loss, loss_rgb, may represent a difference between the predicted color value and the ground truth color value for the labeled training instance.

Non-Color Model Architecture

A BERT-based multitask neural network (or other language model) may be used for extracting non-color makeup asset attributes such as finish types and/or sparkle types. It should be noted that there may be other non-color attributes (e.g., in a clothing-based virtual try-on or even in a makeup scenario) besides finish type and/or sparkle type and that separate classification heads (e.g., FCNs) may be deployed for each prediction task. In an example, text information including a description of the makeup asset, bullet points, a title, etc., may be passed through the BERT encoder. As shown in FIG. 3A, the input uses the [CLS] input token for the classification task and may use the [September] token to separate different portions of the input text. Word and/or sub-word embeddings may be used together with segment embeddings (e.g., representing sentences and/or spans of multiple words) and positional embeddings representing the ordering of sub-words, words, and/or segments. In the illustrated example of FIG. 3A, the [September] tokens are used to separate the title, the bullet point text, and the description text. The output embedding [CLS_out] may be fed to each classification head which may, in turn, be trained via supervised learning to predict an output. In the example of FIG. 3A, the classification heads predict sparkle type and finish type. The training data may be generated using human annotation to assign different finish type classifications (e.g., matte, cream, gloss) to a given text document and different sparkle type classifications (e.g., glitter, shimmer, none, etc.) to each text document. Note that use of respective classification heads for "finish type" and "sparkle type" are shown by way of example only. Additional, fewer, or different classification heads may be used depending on the catalog entry type (e.g., the makeup type). For example, for foundation makeup, there may be a classification head to predict whether or not the foundation makeup asset is "buildable" which may be a characteristic attribute for foundation makeup type (but which may not be applicable to other makeup assets). Generally, the particular classification heads may be selected according to the different types of items (and the characteristic attributes for that type of item) for which material property extraction is being performed.

Figure 3B:
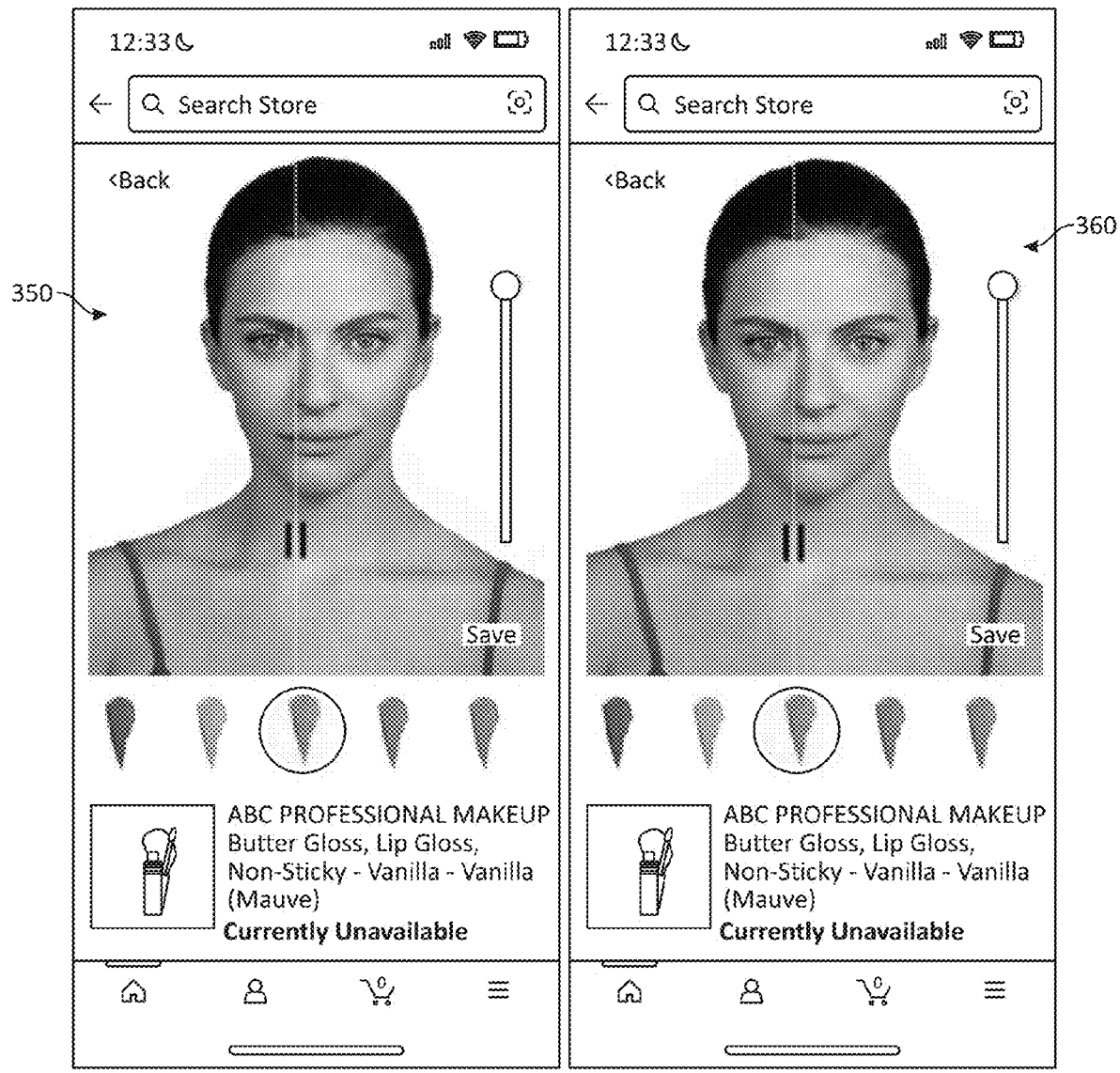
FIG. 3B depicts two rendered augmented reality virtual makeup try-on images, one image with accurate material properties and one without, in accordance with various aspects of the present disclosure.

FIG. 3B depicts two rendered augmented reality virtual makeup try-on images, one image with accurate material properties and one without, in accordance with various aspects of the present disclosure. FIG. 3B juxtaposes two displays of virtual try-on experiences with and without use of the accurate material property extraction techniques described above (e.g., in FIG. 3A, etc.). In the left-most image 350, the color of the lip gloss matches the selected color of the catalog entry as well as the "glossy" finish type. However, in the right-most image 360, the same user-selected makeup has an orange-ish hue and the finish type appears more matte.

Accordingly, accurate material extraction using the machine learning architecture in FIG. 3A is of great importance for accurately rendering virtual makeup assets on a display so that the user is able to see what the makeup would look like on their images (e.g., user-captured images and/or other user-selected images).

Figure 4A:
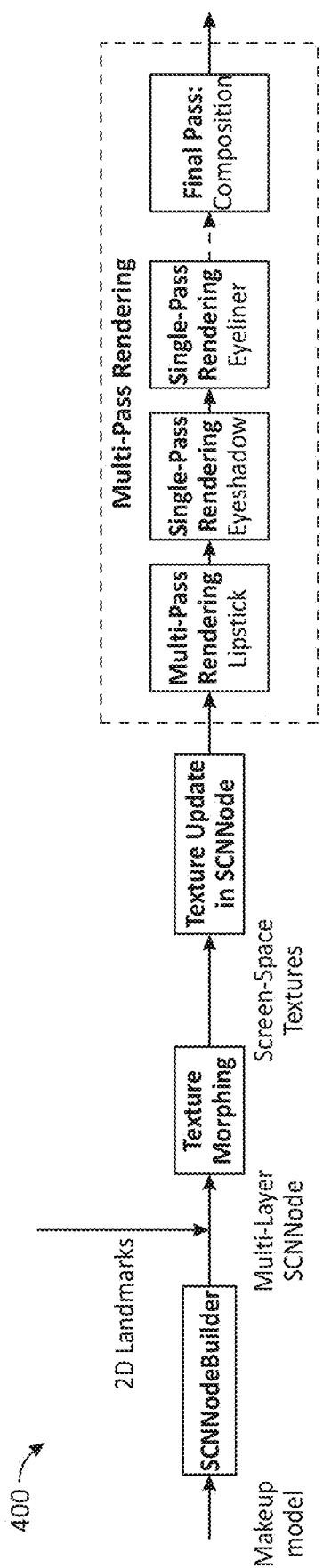
FIG. 4A depicts an example rendering model that may be used to render augmented reality virtual makeup try-on images, in accordance with various aspects of the present disclosure.

FIG. 4A depicts an example rendering model that may be used to render augmented reality virtual makeup try-on images, in accordance with various aspects of the present disclosure. In various examples, the specular highlight color of virtual makeup assets may be controlled independently of the diffuse color using a rendering pipeline such as rendering pipeline 400 in FIG. 4A.

In some examples, single-layer SCNNode class from SceneKit (or another rendering architecture) may be used to render 3D eyeshadow models and/or other virtual makeup assets in a single pass. This may enable for lower-compute, lower-latency rendering on mobile devices and may also enable rendering of multiple virtual makeup assets at the same time in a single virtual try-on experience, without requiring that the user exits the display, selects another virtual makeup asset, and re-renders the new asset. The rendering pipeline of FIG. 4A may make multiple passes for each different makeup category and may store each individual rendered frame in a temporary frame buffer (not shown in FIG. 4A). In a final pass of the rendering pipeline, all rendering results from previous passes (including different categories of virtual makeup assets rendered on the user image) may be combined and/or blended to display all selected virtual makeup assets rendered on the user image.

The landmark detection model outputs 2D landmarks for each frame on the screen image. The corresponding reference landmarks on the texture map are also available on mobile phones for example via ARKit. Delaunay triangles can be created with the 2D landmarks and applying affine transformation from the texture map to the screen image for each triangle allows us to transfer the texture from the texture map to the region defined by the landmark triangles on the screen image. This is referred to as texture morphing.

Figure 4B:
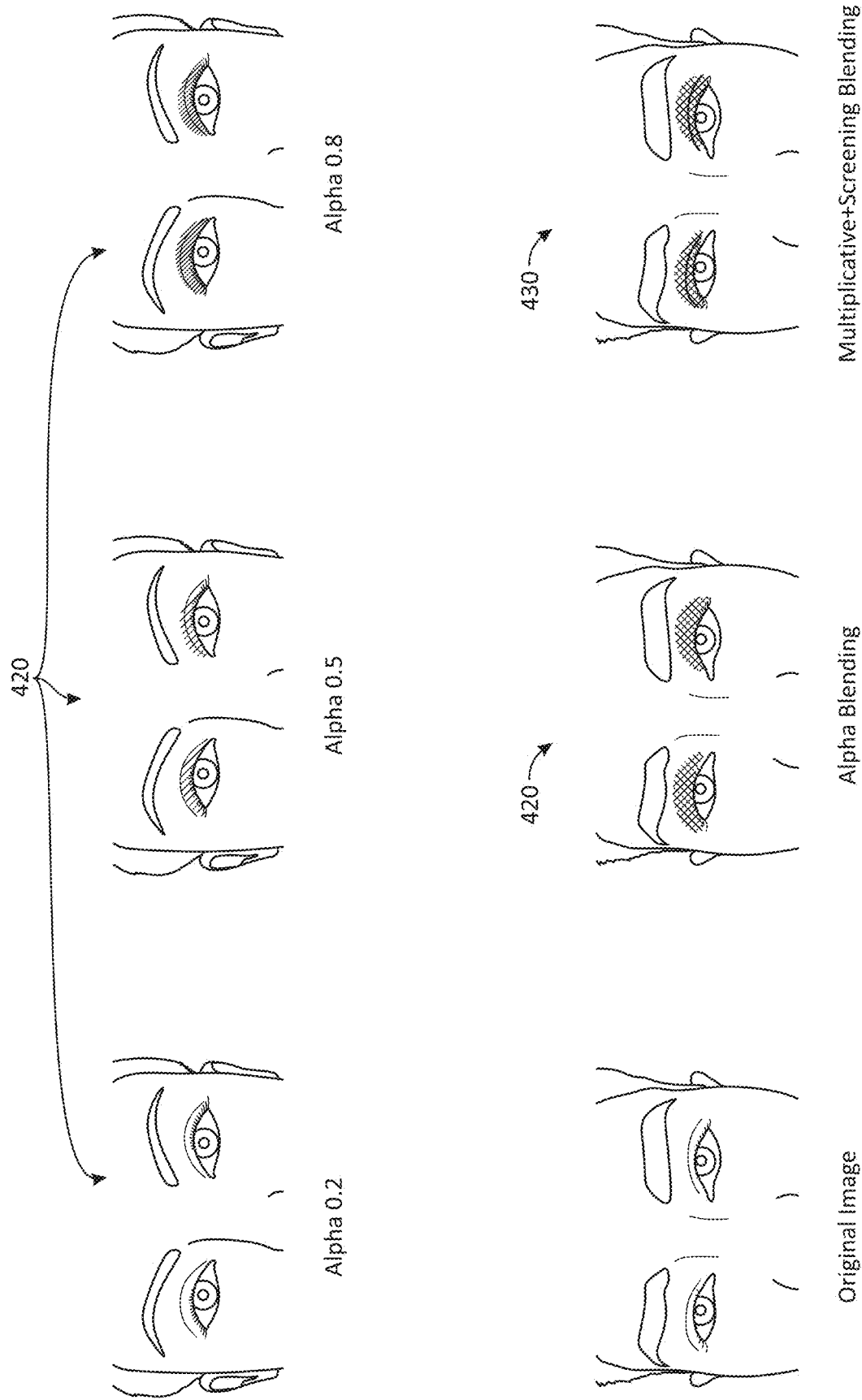
FIG. 4B depicts different blending examples of rendered augmented reality makeup try-on images, in accordance with various aspects of the present disclosure.

FIG. 4B depicts different blending examples of rendered augmented reality makeup try-on images, in accordance with various aspects of the present disclosure. A challenge with rendering virtual makeup assets on user images is the blending of the makeup for different skin tones such that the rendered virtual makeup asset looks realistic for the different skin tones. In addition, some makeup assets may occlude areas such as eye lashes or eye brows.

Blending approach 420 uses an alpha-blending method to mix the eyeshadow color of the virtual makeup asset with the skin color of the image. As shown, higher alpha values increase the opacity of the virtual makeup asset. For example, at $\alpha=0.8$ more eyeshadow is seen, but fewer skin details (e.g., creases in the eyelid) are shown. With lower alpha values ($\alpha=0.2$), more skin details are shown, but the eyeshadow color is not easily visible.

Accordingly, a new blending approach 430 may be employed. Blending approach 430 is a more sophisticated blending method that preserves skin details without softening the color of the virtual makeup asset (e.g., the eyeshadow color). For example, a given frame of image data may first be separated into several layers. For example, luminance thresholding may be used to separate the input image into a shadow layer (e.g., luminance below a certain shadow threshold value), a mid-tone layer (e.g., luminance above the shadow threshold, but below a higher luminance threshold), etc. Multiplicative and screening blending may be applied to each layer correspondingly followed by an alpha-blending to composite the results. As shown in FIG. 4B, the result is that physical characteristics of the skin can be seen (e.g., the line in the eyelid) without softening the color of the virtual makeup asset. In general, any desired blending approach (including those shown and described in reference to FIGS. 4A, 4B) may be used in accordance with the desired implementation.

Figure 5:
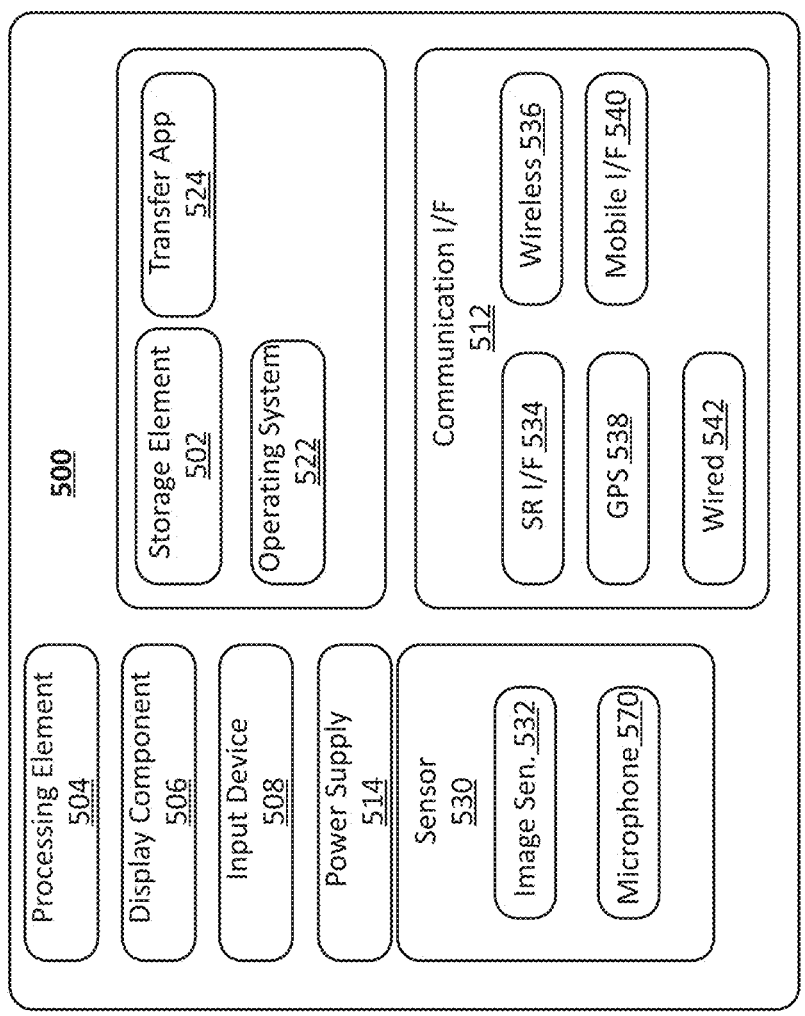
FIG. 5 is a block diagrams showing an example architecture of a computing device that may be used in accordance with various embodiments described herein.

FIG. 5 is a block diagram showing an example architecture 500 of a computing device that may be used for the various techniques described herein, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or 3D room models generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, depth sensors (e.g., a Lidar sensor), and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s) 120, as described herein, are exemplary, and may be located as a stand-alone device or may be included, in whole or in part, as a component of a larger device or system.

Figure 6:
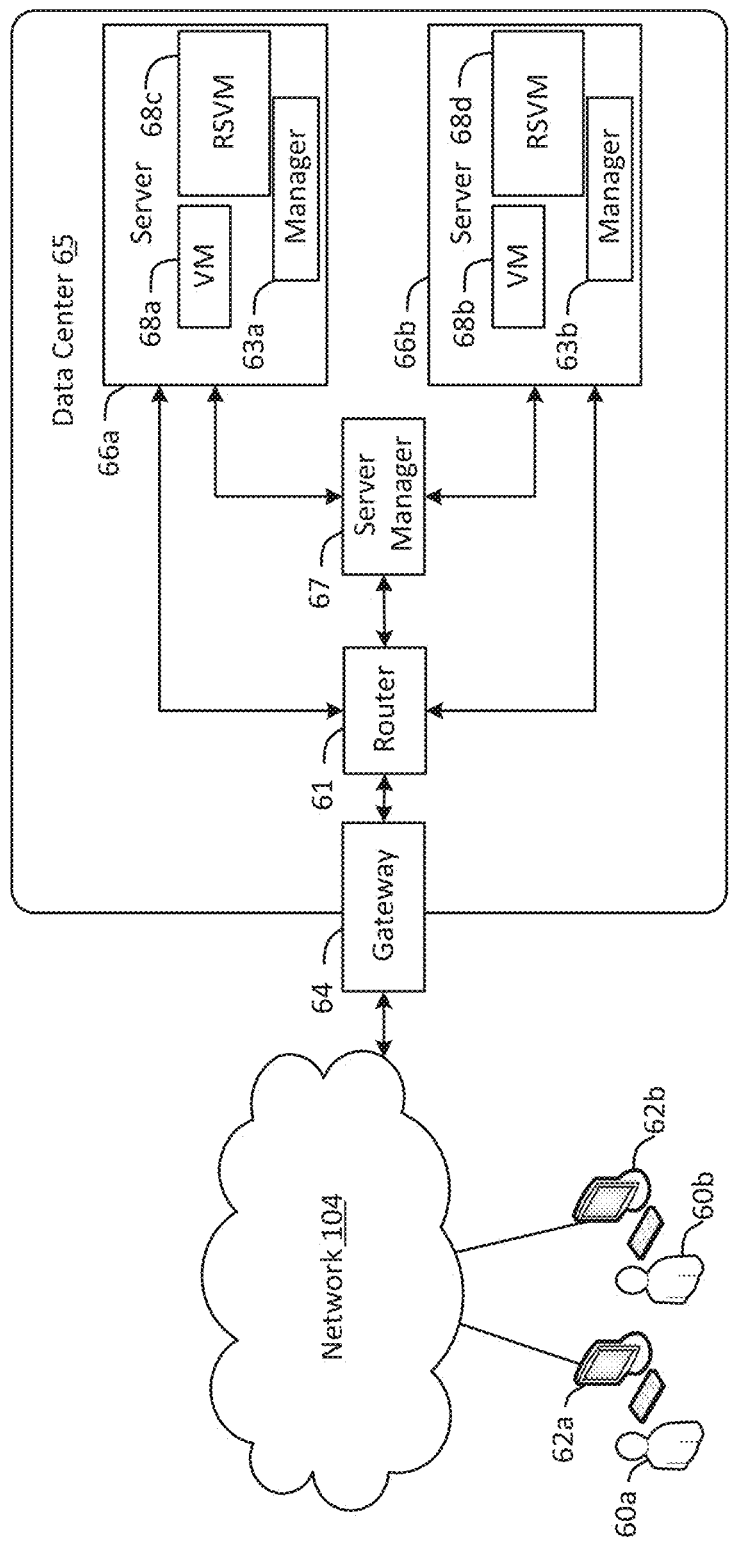
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the virtual try-on experience and/or the material property extraction techniques as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various dynamic occlusion techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources-consisting of many processors, large amounts of memory and/or large storage capacity- and small resources-consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66*a* and 66*b*. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66*a* and 66*b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++ and the like or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
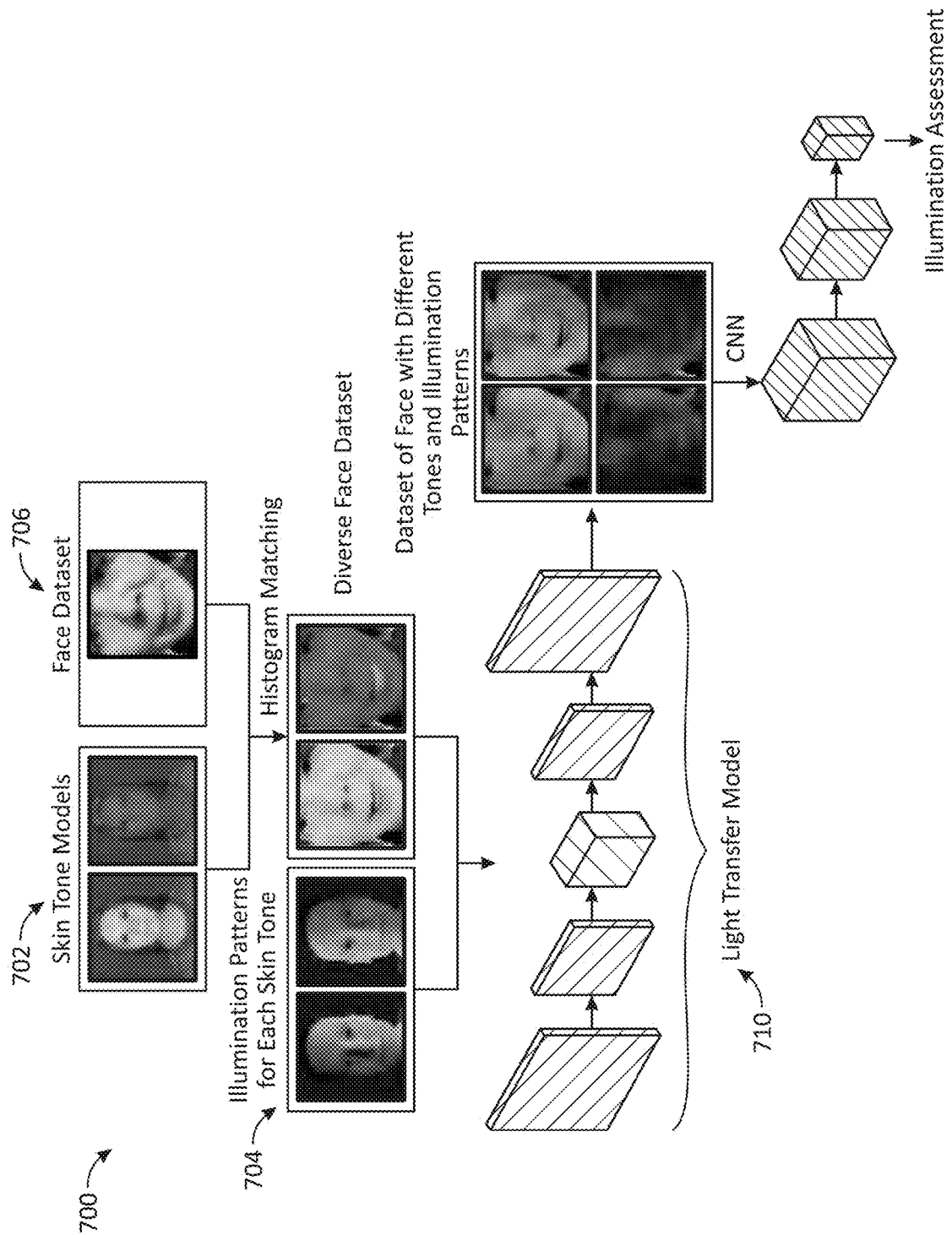
FIG. 7 depicts an example machine learning architecture that may be used to assess illumination of input images of human faces, in accordance with various aspects of the present disclosure.

FIG. 7 depicts an example machine learning architecture 700 that may be used to assess illumination of input images of human faces, in accordance with various aspects of the present disclosure. A 3D modeling software may be used to create models of different skin tones 702 and illumination patterns 704. These 3D models may be labeled for downstream tasks such as face recognition. The skin tones, light patterns, and their associated labels are transferred to a face dataset 706 (with faces under neutral illumination). A classifier (e.g., MobileNet-v2, etc.) may be trained on the constructed dataset to predict two classes-good illumination or bad illumination.

The illumination patterns 704 may be generated by moving two spot light sources around the grid of coordinate values relative to a model of a human face. The grid covers situations where the light sources illuminate the face from the side and/or are located above, below, and in front of the face model. Different skin tones may be obtained by linearly combining textures of light and dark-skinned models to represent a wide variety of skin tones.

To transfer skin tone from a source to a target image, segmentation may be used to segment the skin area of the face (e.g., from hair, eyes, etc.). In some examples, the BiSeNet semantic segmentation architecture may be used (although other semantic segmentation approaches may be employed). BiSeNet is a real time semantic segmentation architecture with two branches, the first of which captures low level details, and the second of which captures high-level context. Segmenting the face skin area is followed by a histogram matching technique. To perform histogram matching, the cumulative color histogram of the source and reference images, denoted by Cs and Cy are calculated, where source and reference refer to the face image and the skin tone model, respectively. Having the cumulative histogram functions, the output image $I_o$ for pixel p is derived from the input image I using:

$$I_o(p) = v_r\left(C_r^{-1}\left(C_s\left(\frac{I(p) - \min(I) + 1}{V}\right)\right)\right), \quad (1)$$

where $C_r^{-1}$ acts as a reverse lookup on the histogram, V is the histogram bin width, and function v is defined as:

$$v(i) = \min(I) + (i-1)V. \quad (2)$$

DPR Model to Transfer Illumination Patterns

As previously described (e.g., illumination estimation 126 of FIG. 1), target lighting may be applied to the source image to generate the output (e.g., the output may be the 3D virtual makeup asset model with the appropriate illumination applied). A light transfer model 710 (e.g., Distributed Persistent Rendering (DPR)) takes a spherical harmonic (SH) lighting as the target illumination and an image (e.g., a portrait of the human face) as the source image. As shown, a CNN (e.g., MobileNet-v2 pretrained on ImageNet) may be used to classify (e.g., assess) the illumination applied to source images with cross-entropy loss. In various examples, once trained, the illumination may be applied to 3D virtual makeup assets so that they appear realistic according to the actual lighting conditions on the camera view of a user's face (see, e.g., FIG. 1).

Figure 8A:
FIGS. 8A-8D depict various example user interfaces that may be used with an augmented reality virtual makeup try-on system, in accordance with various aspects of the present disclosure.
Figure 8B:
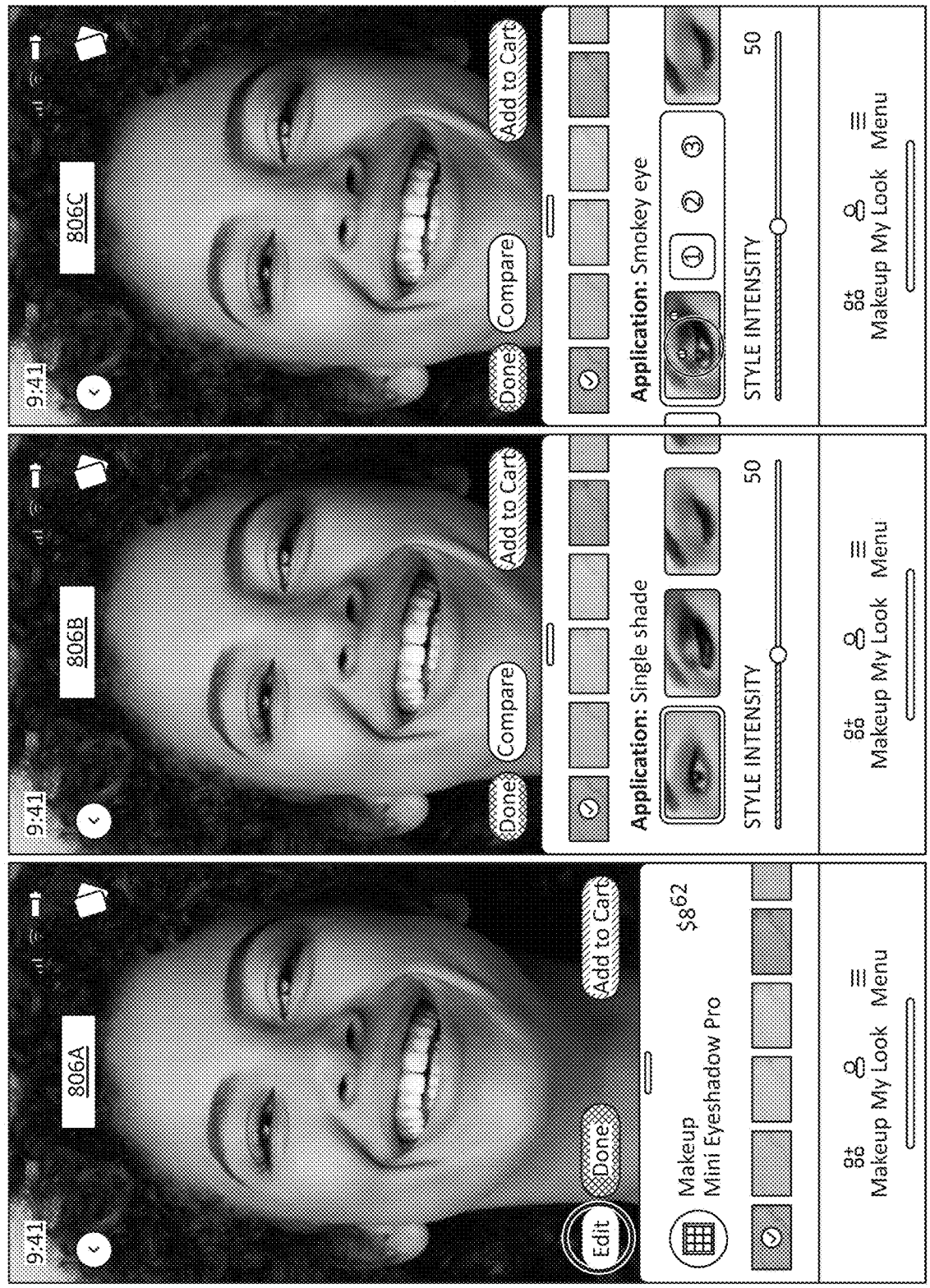

FIGS. 8A-8D depict various example user interfaces that may be used with an augmented reality virtual makeup try-on system, in accordance with various aspects of the present disclosure. The example graphical user interface (GUI) 802 of FIG. 8A, depicts a live view (or static captured image) of a user's face (or a pre-selected image of a face). In the example, the user has selected a particular makeup asset (or set of makeup assets) from a catalog entry (e.g., an item listing on an e-commerce website for a particular makeup item). The user may select various attributes of the makeup item (e.g., color, finish type, sparkle type). In the example shown in GUI 802, the user has selected a red colored lipstick and gray colored eye shadow. As shown, there is a selectable control ("Compare" button on GUI 802). Upon selection, as shown in the example GUI 804, a virtual divider 830 is displayed which may divide the GUI 804 into a before and after view of the user. For example, on the left side of the virtual divider 830, an unmodified view of the user's face may be displayed (e.g., without any virtual makeup assets rendered on the user image), while on the right side of the virtual divider 830, the selected virtual makeup assets (e.g., lipstick and eye shadow, in the current example) may be rendered using the various techniques described herein with accurate material properties. In some other examples, one side of the virtual divider 830 may display a subset of selected virtual makeup assets applied, while the other side of the virtual divider 830 may display a different subset (or the full set) of virtual makeup assets applied, depending on various user-selected options. For example, the user may want to compare a look in which a first color of lipstick is applied with an eyeshadow and a look in which a different color of lipstick is applied with the same eyeshadow. The user may select a first set of makeup assets (and/or a first set of makeup asset attributes) for view on one side of the virtual divider 830 and a different set of makeup assets (and/or attributes) on the other side of the virtual divider 830.

The virtual divider 830 may be selected by the user on the GUI 804 and may be dragged horizontally (e.g., translated horizontally or in any other orientation (e.g., vertically)) to place the virtual divider in any desired position. For example, selection and/or dragging of the virtual divider 830 may provide control inputs to the interface to enable movement of the virtual divider 830. The image of the user may, in some cases, be a live camera view of the user so that the user can change their expression and/or position or vantage of their face to view the virtual makeup assets from various angles. The virtual makeup assets may be rendered in real-time on a frame-by-frame basis using the various techniques described herein.

GUI 806A (FIG. 8B) shows an "Edit" selectable graphical control which may be selected by the user to enable the user to edit various properties of the currently-selected virtual makeup assets. For example, in GUI 806B, after selection of the "Edit" selectable graphical control in GUI 806A, the user may select a different application style (e.g., single shade, smokey eye, etc., for eye shadow) to see a different application style of the virtual makeup asset rendered. Using the Edit selectable graphical control, the users may refine the application style of makeup (e.g., different styles of eye shadow) enabling intricate multi-shade looks (e.g., smokey eye). Additionally, a style intensity slider is shown that may be used to affect an intensity of the style (e.g., from heavier application of the virtual makeup asset to lighter application, and/or to increase a gradient, etc.). Additionally, different tones and/or finishes of currently-selected virtual makeup assets may be represented on the graphical display. For example, different tones may be selectable to change the color of the currently-rendered virtual makeup assets. In the examples of GUIs 806A, 806B, 806C different shades of eye-shadow are shown. The user may select different shades to have the different color eye-shadows rendered.

Data may be stored to reflect the currently-applied user selected virtual makeup assets (e.g., as a "look"). The data may store the various catalog entries associated with each of the currently-applied virtual makeup assets. In general, various graphical controls may be displayed to enable the user to browse different item types, item attributes, materials, search through the catalog based on their preferred items (e.g., brands, etc.), colors, finish type, rating, etc. Such functionalities may be made available through the "Makeup" tab shown at the bottom of the GUIs 806A, 806B, 806C.

Figure 8C:
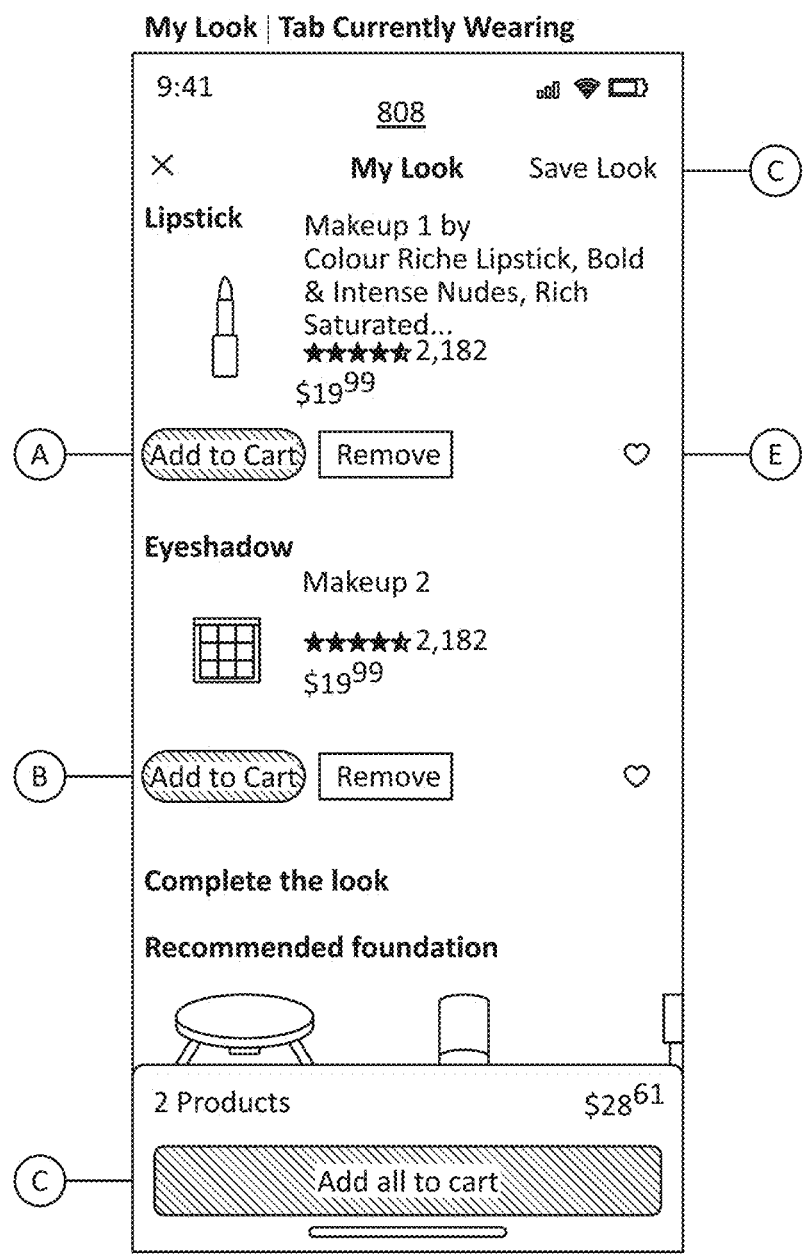
Figure 8D:
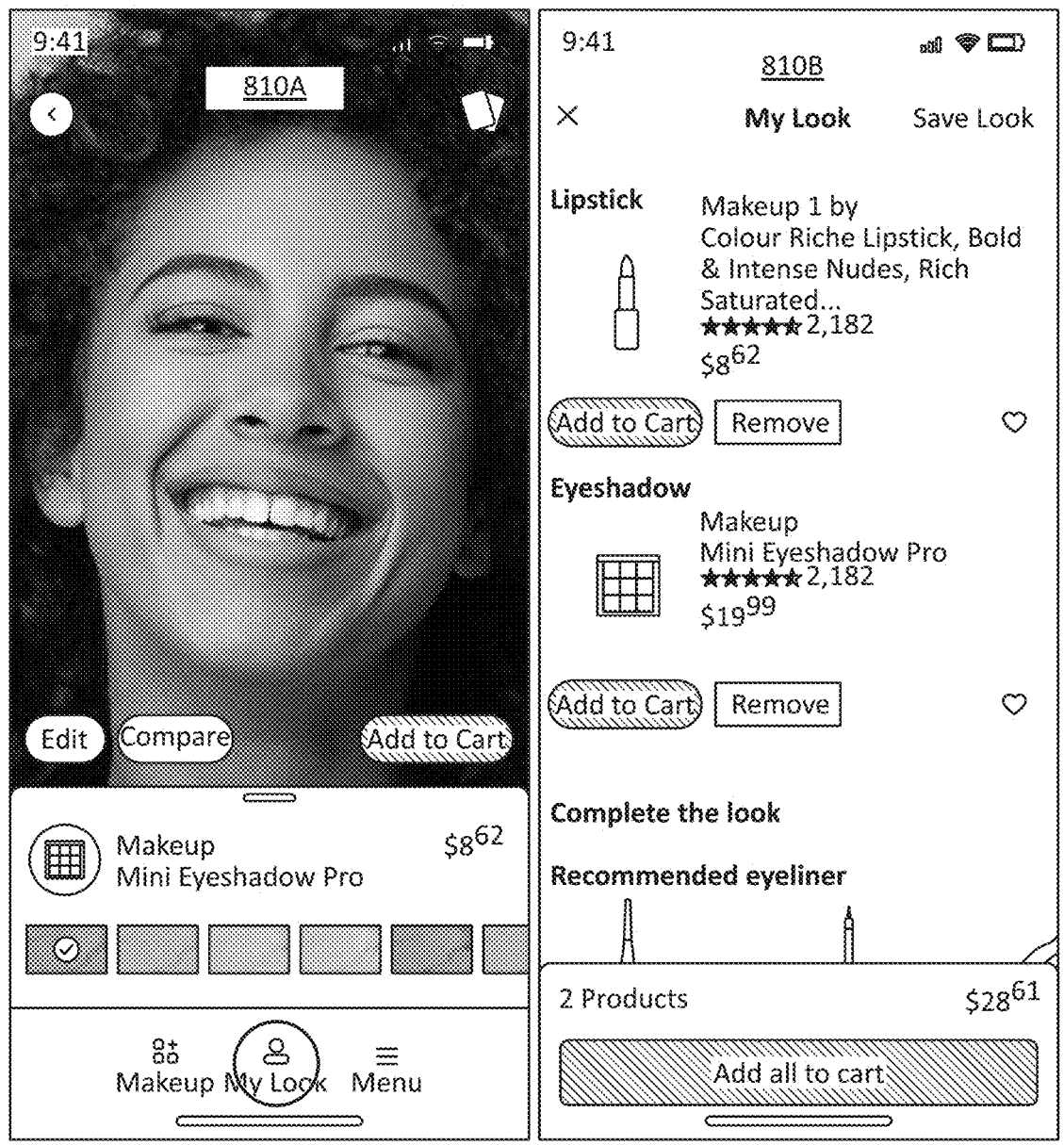

GUI 808 in FIG. 8C may be accessed, for example, by selecting the "My Look" tab from the GUIs 806A, 806B, 806C. Selection of the My Look tab displays the list of currently-applied user-selected makeup assets and may enable the user to purchase the assets in the look and/or to select individual items to navigate to detailed item pages for the individual makeup assets. In addition, functionality may be enabled to allow the user to save the current look, add or remove items from the current look, add all to cart, share the look, favorite individual items, etc. In addition, other products that are visually complementary to the current look may be displayed as recommendations to the user. In some examples, the user may swipe up (or some other direction) from the GUIs 806A, 806B, 806C to reach the GUI 808 in FIG. 8C. In GUI 810A in FIG. 8D a user may select the selectable graphical control "My Look" to see the item listings corresponding to the currently-applied virtual makeup assets in a separate GUI 810B.

Figure 9:
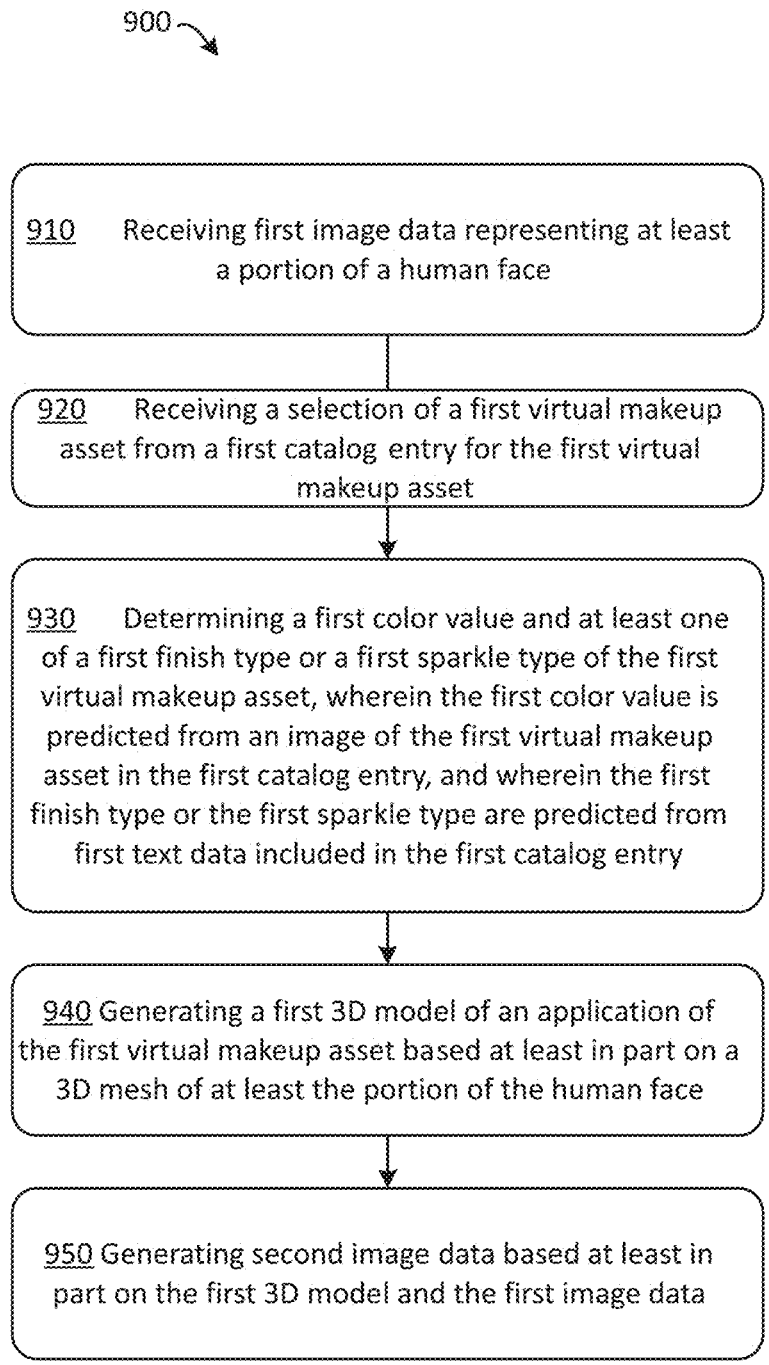
FIG. 9 is a flow chart depicting an example process for virtual makeup try-on, in accordance with various aspects of the present disclosure.

FIG. 9 is a flow chart depicting an example process 900 for virtual makeup try-on, in accordance with various aspects of the present disclosure. Those portions of FIG. 9 that have been previously discussed in reference to FIGS. 1-8 may not be described again for purposes of clarity and brevity. The actions of the process 900 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 900 of FIG. 9 may begin at action 910, at which first image data representing at least a portion of a human face may be received. For example, the first image data may include one or more frames of image data in a live view of a user's face captured using a camera of the user's mobile device (e.g., mobile phone or other mobile device). In another example, the first image data may be a selected image (e.g., an image of a face model) that is selected by the user for the virtual makeup try-on experience.

Processing may continue at action 920, at which a selection of a first virtual makeup asset from a first catalog entry for the first virtual makeup asset may be received. For example, a user may browse a catalog of various makeup assets and may select a particular makeup asset (or multiple makeup assets) for the virtual try-on experience.

Processing may continue at action 930, at which a first color value and at least one of a first finish type or a first sparkle type of the first virtual makeup asset may be determined. In various examples, the first color value may be predicted from an image of the first virtual makeup asset in the first catalog entry. For example, segmentation-based classification (using a segmentation-based classifier) may be used as described above in reference to FIG. 3A to determine a mask from an image included in a catalog entry for the makeup asset that represents the color of the makeup asset (as distinguished from other parts of the input image that do not correspond to the color of the makeup asset). An RGB color value may be determined for the extracted mask (e.g., after sampling a pixel and applying a 15×15 filter kernel). The finish type and/or the sparkle type may be predicted from the text using a BERT-based classification head as described above in reference to FIG. 3A. It should be noted that other language models may be used to predict the finish type and/or sparkle type apart from the specific implementation described in reference to FIG. 3B.

Processing may continue at action 940, at which a first 3D model of an application of the first virtual makeup asset may be generated based at least in part on a 3D mesh of at least the portion of the human face. For example, as described above in reference to FIG. 1, a 3D makeup asset 130 may be retrieved and may be rendered according to the illumination estimation 126 and the extracted color values, finish type, and/or sparkle type. Further the rendering may be based on the 3D mesh 124 of the face detected using LiDAR (or other depth sensing technology) to conform to the contours of the 3D mesh 124.

Processing may continue at action 950, at which second image data may be generated based at least in part on the first 3D model and the first image data. For example, as described above in reference to FIG. 1, the PBR 3D rendering may be warped based on the 2D landmarks detected in the input 2D image data so that the PBR-based 3D rendering 132 of the 3D makeup asset 130 may appear in an accurate and realistic way on the images of the user's face. Additionally, the pixels representing the makeup and the pixels representing the user's face may be blended as described in FIG. 4B. The resulting composite frame that represents the user's face with the various virtual makeup assets applied may be the second image data.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   receiving a first input image representing a human face;
   generating a three-dimensional (3D) mesh representing the human face using depth information received from a depth sensor;
   determining estimated illumination characteristics of the 3D mesh using spherical harmonics;
   receiving a selection of a virtual makeup asset, the virtual makeup asset comprising a first RGB color value, a finish value, and a sparkle type;
   generating a 3D model of the virtual makeup asset warped to conform to the 3D mesh representing the human face;
   rendering the 3D model using physical-based rendering (PBR), the estimated illumination characteristics, the first RGB color value, the finish value, and the sparkle value;
   detecting a plurality of two-dimensional (2D) facial landmarks using a convolutional neural network and the first input image;
   generating a warped representation of the rendered 3D model using the plurality of 2D facial landmarks;
   determining a position at which to render the warped representation on a second input image representing the human face using the plurality of 2D facial landmarks; and
   rendering a two-dimensional view of the warped representation of the rendered 3D model at the position on the second input image representing the human face.

2. The method of claim 1, further comprising:
   determining a second RGB color value at the position on the second input image; and
   determining a blended RGB color value at the position using the first RGB color value, the second RGB color value, and at least one blending parameter.

3. The method of claim 1, further comprising:
   receiving catalog entry data representing a catalog entry of a makeup asset corresponding to the virtual makeup asset;
   receiving an image of the makeup asset from the catalog entry data;
   determining, using a segmentation-based machine learning model, a region of the image that is predicted to represent a color of the makeup asset; and
   determining an average RGB pixel value of the region, wherein the first RGB color value is the average RGB pixel value.

4. The method of claim 3, further comprising:
   determining first text data of the catalog entry data, the first text data comprising a title of the catalog entry and a description of the catalog entry;
   generating word embeddings, segment embeddings, and positional embeddings representing the first text data;
   generating a first encoded representation of the first text data using a transformer-based language model;

inputting the first encoded representation into a first classifier trained to predict finish values of makeup assets;
predicting, by the first classifier, the finish value;
inputting the first encoded representation into a second classifier trained to automatically predict sparkle values of makeup assets; and
predicting, by the second classifier, the sparkle value.

5. A method comprising:
receiving first image data representing at least a portion of a human face;
receiving a selection of a first virtual makeup asset from a first catalog entry for the first virtual makeup asset;
determining a first color value and at least one of a first finish type or a first sparkle type of the first virtual makeup asset, wherein the first color value is predicted from an image of the first virtual makeup asset in the first catalog entry, and wherein the first finish type or the first sparkle type are predicted from first text data included in the first catalog entry;
generating a first three-dimensional (3D) model of an application of the first virtual makeup asset based at least in part on a 3D mesh of at least the portion of the human face; and
generating second image data based at least in part on the first 3D model and the first image data.

6. The method of claim 5, further comprising:
determining a plurality of two-dimensional landmarks of at least the portion of the human face in the first image data;
warping the first 3D model of the application of the first virtual makeup asset using the plurality of two-dimensional landmarks to generate a warped 3D model of the application of the first virtual makeup asset; and
rendering the second image data comprising a combination of a first two-dimensional view of the warped 3D model of the application of the first virtual makeup asset and the first image data, wherein the warped 3D model is rendered at a position on the human face determined based at least in part on the plurality of two-dimensional landmarks.

7. The method of claim 6, further comprising:
determining a second color value of a pixel of the first image data at the position on the human face; and
determining a blended color value at the position using the first color value, the second color value and a blending parameter, wherein the second image data comprises the blended color value at the position.

8. The method of claim 5, further comprising:
displaying a first selectable control on a display of the second image data; and
receiving a selection of the first selectable control, wherein the selection of the first selectable control causes a virtual divider to be displayed on the display, the virtual divider separating the display of the human face into a first portion displaying the second image data with the first virtual makeup asset applied to the human face and a second portion displaying the first image data without the first virtual makeup asset being applied to the human face.

9. The method of claim 8, further comprising receiving a first control input effective to translate the virtual divider in a first direction on the display, wherein translation of the virtual divider in the first direction increases an amount of the human face that is displayed with the first virtual makeup asset applied to the human face relative to an amount of the human face that is displayed without the first virtual makeup asset applied to the human face.

10. The method of claim 5, further comprising:
receiving selection of a second virtual makeup asset from a second catalog entry for the second virtual makeup asset;
generating third image data that renders the first 3D model of the first virtual makeup asset and a second 3D model of the second virtual makeup asset on the human face;
displaying the third image data on an augmented reality display together with a first selectable control;
storing first data representing a list of virtual makeup assets that are represented in a currently-displayed augmented reality display;
receiving a selection of the first selectable control; and
displaying, in response to the selection of the first selectable control, the list of virtual makeup assets.

11. The method of claim 5, further comprising:
determining third image data representing a catalog image of the first virtual makeup asset;
inputting the third image data into a segmentation-based classifier trained to predict a part of an input image that corresponds to a color of a virtual makeup asset as distinguished from other parts of the input image that does not correspond to the color of the makeup asset; and
generating, by the segmentation-based classifier, a first segmentation mask corresponding to the part of the third image data that represents the color of the first virtual makeup asset.

12. The method of claim 11, further comprising:
determining a region of pixels of the first segmentation mask; and
determining an aggregated RGB value of the region of pixels, wherein the first color value comprises the aggregated RGB value of the region of pixels.

13. The method of claim 5, further comprising:
determining the first text data included in the first catalog entry;
generating, using a transformer-based language model, an encoded representation of the first text data; and
predicting, based at least in part by inputting the encoded representation into a first classification head trained with the transformer-based language model, the first finish type, wherein the first finish type is a first prediction of finish type from among a matte type, a cream type, and a gloss type.

14. The method of claim 13, further comprising predicting, based at least in part by inputting the encoded representation into a second classification head trained with the transformer-based language model, the first sparkle type, wherein the first sparkle type is a second prediction of sparkle type from among a plurality of different makeup sparkle types.

15. The method of claim 5, further comprising:
displaying, on a user interface, a list of currently-selected virtual makeup assets;
receiving, on the user interface, a selection of an additional virtual makeup asset; and
generating an augmented reality display comprising at least the portion of the human face with representations of one or more virtual makeup assets from the list of currently-selected virtual makeup assets rendered on the human face and the additional virtual makeup asset rendered on the human face.

16. A system comprising:
   at least one processor;
   non-transitory computer-readable memory storing instructions that, when executed by the at least one processor, are effective to:
      receive first image data representing at least a portion of a human face;
      receive a selection of a first virtual makeup asset from a first catalog entry for the first virtual makeup asset;
      determine a first color value, a first finish type, and a first sparkle type of the first virtual makeup asset, wherein the first color value is predicted from an image of the first virtual makeup asset in the first catalog entry, and wherein the first finish type and the first sparkle type are predicted from first text data included in the first catalog entry;
      generate a first three-dimensional (3D) model of an application of the first virtual makeup asset based at least in part on a 3D mesh of at least the portion of the human face; and
      generate second image data based at least in part on the first 3D model and the first image data.

17. The system of claim 16, the non-transitory computer-readable memory storing further instructions that, when executed by the at least one processor, are further effective to:
   determine a plurality of two-dimensional landmarks of at least the portion of the human face in the first image data;
   warp the first 3D model of the application of the first virtual makeup asset using the plurality of two-dimensional landmarks to generate a warped 3D model of the application of the first virtual makeup asset; and
   render the second image data comprising a combination of a first two-dimensional view of the warped 3D model of the application of the first virtual makeup asset and the first image data, wherein the warped 3D model is rendered at a position on the human face determined based at least in part on the plurality of two-dimensional landmarks.

18. The system of claim 17, the non-transitory computer-readable memory storing further instructions that, when executed by the at least one processor, are further effective to:
   determine a second color value of a pixel of the first image data at the position on the human face; and
   determine a blended color value at the position using the first color value, the second color value and a blending parameter, wherein the second image data comprises the blended color value at the position.

19. The system of claim 16, the non-transitory computer-readable memory storing further instructions that, when executed by the at least one processor, are further effective to:
   display a first selectable control on a display of the second image data; and
   receive a selection of the first selectable control, wherein the selection of the first selectable control causes a virtual divider to be displayed on the display, the virtual divider separating the display of the human face into a first portion displaying the second image data with the first virtual makeup asset applied to the human face and a second portion displaying the first image data without the first virtual makeup asset being applied to the human face.

20. The system of claim 19, the non-transitory computer-readable memory storing further instructions that, when executed by the at least one processor, are further effective to:
   receive a first control input effective to translate the virtual divider in a first direction on the display, wherein translation of the virtual divider in the first direction increases an amount of the human face that is displayed with the first virtual makeup asset applied to the human face relative to an amount of the human face that is displayed without the first virtual makeup asset applied to the human face.

* * * * *